Oct. 15, 1946. L. M. HEDGES 2,409,278
FILTER
Filed Oct. 1, 1943
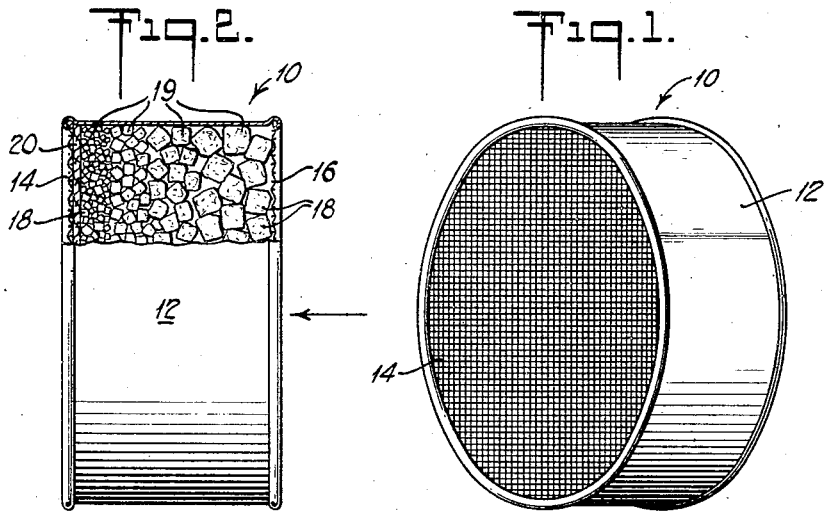
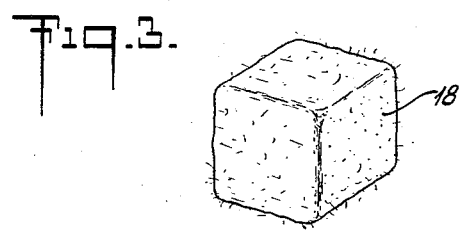
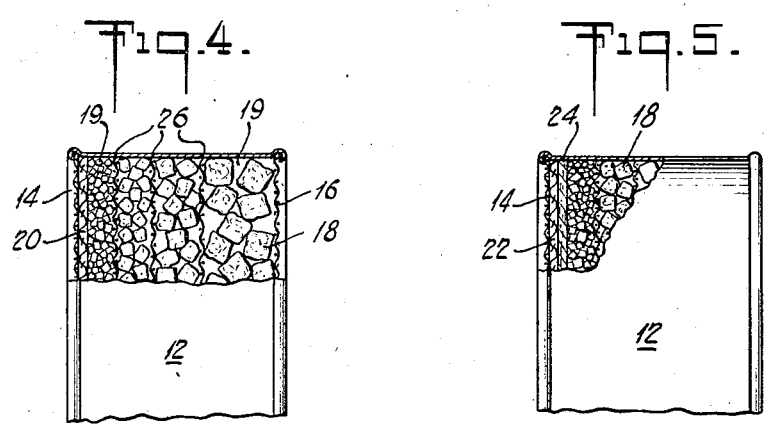
INVENTOR
LEE M. HEDGES.
BY Virgil C. Kline
ATTORNEY Patented Oct. 15, 1946

2,409,278

UNITED STATES PATENT OFFICE 2,409,278

FILTER

Lee Minor Hedges, Somerville, N. J., assignor to Johns-Manville Corporation, New York, N. Y., a corporation of New York Application October 1, 1943, Serial No. 504,558

3 Claims. (Cl. 183—45)

The present invention relates to filters or filter units for the removal of dust or other particulate matter from air or other gases. Filters in accordance with the invention, may be employed in the industrial arts, air conditioning apparatus, respirators, air intakes for internal combustion engines and in any other situation where it is desirable to remove either solid or liquid particulate matter such as dust, dirt, smoke, tars, oils etc. from air and other gases.

The principal object of the invention is the provision of a filter or filtering unit for the purposes referred to, the filter having increased life, low flow resistance and high efficiency as compared to known filters for certain applications. A filter in accordance with the invention is one which will accumulate a large amount of the particulate matter without clogging, and which at the same time operates efficiently in removing very fine particles from the air or other gases. More particularly an object of the invention is the provision of a filter or filtering unit comprising a mass of gas pervious, resilient fibrous bodies, preferably of somewhat rounded shapes, such bodies being hereinafter referred to as "nodules." The nodules are arranged generally in layers and the nodules of each layer are in partial or limited contact with one another, providing voids or pockets therebetween. The nodules may be of various shapes, such as rounded cubes, spheres, ellipsoids and the like.

Another object of the invention is the provision of a filter unit employing nodules formed of felted mineral wool fiber.

Another object of the invention is the provision of a filter comprising a plurality of layers of nodules in which a great number of void spaces or pockets are created with larger voids at the air entry face, the voids progressively diminishing in size to relatively small voids at the air exit face. In the attainment of this object, the invention contemplates the use of relatively large nodules in the layer adjacent the air intake, the nodules of successive layers progressively decreasing in size to smaller nodules in a layer at, or adjacent the air exit face of the unit.

A further object of the invention in one form thereof, is the provision of such filter unit in which a layer adjacent the air exit end of the unit is composed of alternated or intermingled smaller and larger nodules, whereby the voids are decreased and the surface area increased to insure removal of final remnants of the particulate matter which may penetrate to this point.

A still further object of the invention, in certain forms thereof, is the provision of a filter including a plurality of layers of resilient fibrous nodules, the filter including foraminous separators such as fine mesh screens interposed between adjacent layers.

A further object of the invention is the provision of a filter unit including a main filtering body composed of nodules as previously described and a "back up" filter mat or mats of suitable type overlying the nodules at the exit end of the unit. The back up mat is important in making the last layer of nodules relatively impervious to dust or other particulate matter.

My invention will be more fully understood and further objects and advantages thereof will become apparent when reference is made to the more detailed description of the preferred embodiments thereof which is to follow and to the accompanying drawing to which:

Fig. 1 is a perspective view of a filter unit embodying the invention.

Fig. 2 is an elevational view partially in section of the device of Fig. 1.

Fig. 3 is a perspective view of an individual nodule as employed in the instant invention.

Fig. 4 is a view partially in elevation and partially in section illustrating a modified form of the invention, and, Fig. 5 is a view similar to Fig. 4, illustrating a further modification.

Referring now to the drawing, and particularly to Figs. 1, 2 and 3, there is shown a filter unit 10 comprising a cylindrical casing 12, and foraminous end closures 14 and 16. It will be understood that the particular form and character of the casing or holding means for the filter element may vary radically depending upon the particular use to which the filter is to be put, the form shown having been selected only for purposes of illustration.

The filter element or body, in accordance with the invention, comprises a mass or body of resilient fibrous nodules 18 arranged substantially in layers extending transversely to the direction of air flow. Each layer is formed of one or more strata of the nodules and preferably is built up to have a thickness approximately equal to twice the thickness of the individual nodules of the layer. The nodules are preferably formed of inter-felted mineral wool fibers and suitably may be cut from a mineral wool felt as made, for example, by the process disclosed in Powell reissue patent Re. 22,090 dated May 5, 1942. In a felt of this type, the fibers lie predominantly in planes generally parallel to the faces of the mat. Suitably the fibers are maintained in their felted relationship and resilient characteristics are imparted to the mat by a minor proportion of a hardened binder such as an asphalt, resin, drying oil or the like disseminated throughout the mat.

As pointed out above, the nodule is, as illustrated in Fig. 3, preferably of generally cubical shape. The cubes are cut from a felt as described above, and tumbled in a shaker to round off the sharp edges, and to cause the fibers to extend or "fuzz out" from the surface areas. The nodules may take other shapes if desired, such as spheres, ellipsoids and the like. The nodules are elastic, springy and resilient and of sufficiently open structure to allow air to pass through them as well as around them. Fine fibers are desirable to remove the fine particulate matter, relatively fine mineral wool fibers being particularly effective for this purpose. However for some filtering uses, other fibers can be employed such as felted asbestos fibers, kapok fibers and the like.

Nodules 18 are arranged in the filter body to form, in effect, a plurality of layers 19 each preferably comprising a plurality of strata as illustrated in Fig. 2. The nodules adjacent the air entry side of the unit, the direction of air flow being indicated by the arrow, are of relatively large size, say ¾" to 1" or more in diameter. The nodules of the successive layers progressively decrease in size to relatively small nodules in the layer at, or adjacent, the exit end of the unit. The smaller nodules may be say, approximately ⅛" in diameter. It has been found to be preferable to employ nodules of two or more different sizes, for example of ⅛", ¼" and ⅜" diameters alternated or intermixed in the layer at the air exit face of the body as shown in Figs. 2 and 4. This cuts down the void space and increases the surface area to insure removal of any remnants of particulate matter which may penetrate to this final layer. The danger of early clogging of this layer is remote due to the relatively small amount of matter which will reach it. The nodules are placed within the container or housing and are pressed firmly and held in this condition as by the heads 14 and 16 so as to resist displacement due to vibration but without such undue compaction as would destroy the numerous openings and voids.

Where a high degree of efficiency is desired one or more "back up" filter mats may be employed as illustrated at 20 in Fig. 2. Such a mat may comprise cotton flannel or a thin felted layer of mineral wool fibers or the like, or both. Fig. 5 illustrates the use of a plurality of filter mats of different types. The unit shown includes elements comprising a cotton flannel or similar fabric 22, and a thin felted layer of mineral wool fibers 24 interposed between the face screen 14 and the nodule body at the air exit end of the unit.

In accordance with a further modification of the invention, successive layers of nodules of different sizes may be separated by open mesh screen material as shown at 26 in Fig. 4. These separator screens may be of metal, paper, plastic, or the like of suitably heavy construction to prevent undue distortion under the pressures applied. For example, wire screen in which the individual wires have diameters of say 0.05" to 0.06", has been found to be suitable. The screens separate the successive layers and keep the structure open at the interfaces between layers. This feature overcomes a tendency of the nodules of differing sizes to line up and fit together at the interface, thus reducing the void spaces. As will be understood, in the event that the void space is too greatly reduced at these locations, the travel of particulate matter into the filter is stopped and because of the undue localizing of the filtered matter, flow resistance is quickly built up.

A filter in accordance with the invention provides a great number of voids and pockets with relatively large voids adjacent the air entry face, the voids progressively diminishing in size through the filter to very small voids adjacent the air exit face. By this arrangement the filtered matter is distributed substantially uniformly throughout the body. That is, clogging occurs substantially simultaneously throughout the thickness of the filter with the result that most, if not all, of the particle retaining capacity of the filter is employed. The resilient characteristics and shapes of the nodules, as distinguished from ordinary so called nodulated wool employed for general insulating purposes, prevent settling or deformation which would fill the voids and destroy or greatly lessen the effectiveness of the filter. The arrangement of small to large nodules from air exit to air entry ends of the unit not only greatly increases the dust retaining capacity, but also permits cleaning of the unit by the simple expedient of sharply jarring it with the air entry face down. Either during the jarring of the unit or thereafter, air may be blown in a reverse direction through the unit to remove loosened particles.

Having thus described my invention in rather full detail, it will be understood that these details need not be strictly adhered to, but that various changes and modifications will suggest themselves to one skilled in the art, all falling within the scope of the invention as defined by the subjoined claims.

What I claim is:

1. In a filter unit for the removal of particulate matter from gases, a confined body comprising resilient nodules of mineral wool fibers maintained in inter-felted relationship by a hardened binder, the nodules being arranged generally in the form of layers and defining voids therebetween, and the nodules of successive layers varying in size from larger nodules in a layer adjacent the entry face of the unit, to smaller nodules in a layer adjacent the air exit face of the unit.

2. In a filter unit for the removal of particulate matter from gases, a confined body comprising air pervious nodules composed of a resilient inter-felted open fibrous structure, the fibers thereof being maintained in inter-felted relationship by a hardened binder, said nodules being of rounded shape and arranged generally in the form of layers, adjacent nodules of a layer being in limited contact to define numerous pockets and voids, the nodules of successive layers varying in size from larger nodules in a layer adjacent the entry face of the unit, to smaller nodules in a layer adjacent the air exit face of the unit.

3. In a filter unit for the removal of particulate matter from gases, a confined body comprising resilient nodules of open fibrous structure comprising segments of a binder containing resilient mineral wool felt, said nodules being of rounded shape and arranged approximately in layers with adjacent nodules of a layer in limited contact to define numerous pockets and voids, the nodules of the successive layers varying in size from larger nodules in a layer adjacent the air entry face of the unit, to smaller nodules in a layer adjacent the air exit face of the unit, a foraminous screen overlying said exit face and a fibrous filtering layer interposed between said screen and said nodules.

LEE MINOR HEDGES.